(12) United States Patent
Subramanian et al.

(10) Patent No.: US 9,561,493 B2
(45) Date of Patent: Feb. 7, 2017

(54) SYNTHESIS OF PYROCHLORE NANOSTRUCTURES AND USES THEREOF

(71) Applicants: Vaidyanathan Subramanian, Sparks, NV (US); Sankaran Murugesan, Austin, TX (US)

(72) Inventors: Vaidyanathan Subramanian, Sparks, NV (US); Sankaran Murugesan, Austin, TX (US)

(73) Assignee: Board of Regents of the Nevada System of Higher Education, on Behalf of the University of Nevada, Reno, Reno, NV (US)

( * ) Notice: Subject to any disclaimer, the term of this patent is extended or adjusted under 35 U.S.C. 154(b) by 13 days.

(21) Appl. No.: 14/552,230

(22) Filed: Nov. 24, 2014

(65) Prior Publication Data

US 2015/0080213 A1    Mar. 19, 2015

Related U.S. Application Data

(62) Division of application No. 13/105,102, filed on May 11, 2011, now Pat. No. 8,900,537.

(Continued)

(51) Int. Cl.
*B01J 23/18* (2006.01)
*B82Y 30/00* (2011.01)
(Continued)

(52) U.S. Cl.
CPC .............. *B01J 23/18* (2013.01); *B82Y 30/00* (2013.01); *B82Y 40/00* (2013.01); *C01G 29/00* (2013.01);
(Continued)

(58) Field of Classification Search
CPC .......... B01J 23/18; B82Y 40/00; B82Y 30/00; C01G 29/00; C01P 2002/36; C01P 2002/72; C01P 2002/84; C01P 2004/03; C01P 2004/04; C01P 2004/16
See application file for complete search history.

(56) References Cited

U.S. PATENT DOCUMENTS

2008/0318761 A1    12/2008    Riedel et al.

OTHER PUBLICATIONS

Wang, Shu Mei, et al. "Nanorods of La 2 Sn 2 O 7 synthesized in ethanol solvent." Journal of alloys and compounds 424.1 (2006): L3-L5.*

(Continued)

*Primary Examiner* — Richard M Rump
(74) *Attorney, Agent, or Firm* — Klarquist Sparkman, LLP

(57) ABSTRACT

A template-free reverse micelle (RM) based method is used to synthesize pyrochlore nanostructures having photocatalytic activity. In one embodiment, the method includes separately mixing together a first acid stabilized aqueous solution including pyrochlore precursor A and a second acid stabilized aqueous solution including pyrochlore precursor B with an organic solution including a surfactant to form an oil-in-water emulsion. Next, equimolar solutions of the first and second acid stabilized oil-in-water emulsions are mixed together. Then, the mixture of the first and second acid stabilized oil-in-water emulsion is treated with a base to produce a precipitate including pyrochlore precursors A and B. After which, the precipitate is dried to remove volatiles. The precipitate is then calcined in the presence of oxygen to form a pyrochlore nanostructure, such as a bismuth titanate ($Bi_2Ti_2O_7$) pyrochlore nanorod. The method of synthesizing the pyrochlore nanorod is template-free.

9 Claims, 8 Drawing Sheets

Related U.S. Application Data

(60) Provisional application No. 61/333,463, filed on May 11, 2010.

(51) Int. Cl.
*B82Y 40/00* (2011.01)
*C01G 29/00* (2006.01)

(52) U.S. Cl.
CPC ........ *C01P 2002/36* (2013.01); *C01P 2002/72* (2013.01); *C01P 2002/84* (2013.01); *C01P 2004/03* (2013.01); *C01P 2004/04* (2013.01); *C01P 2004/16* (2013.01); *Y10T 428/298* (2015.01); *Y10T 428/2913* (2015.01); *Y10T 428/2982* (2015.01)

(56) References Cited

OTHER PUBLICATIONS

Shen, S., et al. "Preparation and Characterization of Nano Bi—2Sn—2O—7 via Water/Oil Microemulsion." Chinese Journal of Applied Chemistry 23.6 (2006): 641.*
Zhou, Hongjun, Tae-Jin Park, and Stanislaus S. Wong. "Synthesis, characterization, and photocatalytic properties of pyrochlore Bi 2 Ti 2 O 7 nanotubes." Journal of materials research 21.11 (2006): 2941-2947.*
Mao, Yuanbing, et al. "Luminescent nanocrystals with A2B2O7 composition synthesized by a kinetically modified molten salt method." The Journal of Physical Chemistry C 113.4 (2009): 1204-1208.*
Fuentes, Antonio F., et al. "Synthesis of disordered pyrochlores, A2Ti 2 O 7 (A=Y, Gd and Dy), by mechanical milling of constituent oxides." Solid state sciences 7.4 (2005): 343-353.*
Rao, K. Koteswara, et al. "Preparation and characterization of bulk and nano particles of La 2 Zr 2 O 7 and Nd 2 Zr 2 O 7 by sol-gel method." Materials Letters 54.2 (2002): 205-210.*
Johnson, Michel B., et al. "Thermal properties of the pyrochlore, Y 2 Ti 2 O 7." Journal of Solid State Chemistry 182.4 (2009): 725-729.*
Anpo, et al., The Design and Development of Highly Reactive Titanium Oxide Photocata lysts Operating under Visible Light Irradiation, Journal of Catalysis, vol. 216, 2003, pp. 505-516.
Chen, et al., SrSnO3 Nanostructures: Synthesis, Characterization, and Photocatalytic Properties, Chem. Mater., vol. 19, 2007, pp. 4585-4591.
Cheng et al., Catalytic Combustion of Methane over Cobalt Doped Lanthanum Stannate Pyrochlore Oxide, Catalysis Communications vol. 9, 2008, pp. 690-695.
Chiou et al., Photocatalytic Splitting of Water on NiO/InTaO4 Catalysts Prepared by an Innovative Sol-Gel Method, Applied Catalysis A: General, vol. 357, 2009, pp. 73-78.
Choi, et al., The Role of Metal Ion Dopants in Quantum-Sized TiO2: Correlation between Photoreactivity and Charge Carrier Recombination Dynamics, J. Phys. Chem., vol. 98,1994, pp. 13669-13679.
Evans, et al., a-Bi2Sn2O7—A 176 Atom Crystal Structure from Powder Diffraction Data, J. Mater. Chem., vol. 13, 2003, pp. 2098-2103.
Feng, et al., Discoloration and Mineralization of Orange II by Using Fe3+-Doped TiO2 and Bentonite Clay-Based Fe Nanocatalysts, Catalysis Today, vol. 98, 2004, pp. 441-446.
Fujishima, et al., Electrochemical Photolysis of Water at a Semiconductor Electrode, Nature, vol. 238, Jul. 7, 1972, pp. 37-38.
Goodenough, et al., Defect Pyrochlores as Catalyst Supports, Journal of Solid State Chemistry, vol. 44, 1982, pp. 108-112.
Hagfeld, et al., Light-Induced Redox Reactions in Nanocrystalline Systems, Chem. Rev., vol. 95, 1995, pp. 49-68.
Hector, et al., Synthesis and Structural Study of Stoichiometric Bi2Ti2O7 Pyrochlore, Journal of Solid State Chemistry, vol. 177, 2004, pp. 139-145.
Hedvall, Changes in Crystal Structure and Their Influence on the Reactivity and Catalytic Effect of Solids, Chemical Reviews, vol. 15, No. 2, 1934, pp. 139-168.
Hoffmann, et al., Environmental Applications of Semiconductor Photocatalysis, Chem. Rev., vol. 95, 1995, pp. 69-96.
Hou, et al., Electrical and Optical Properties of Bi2Ti2O7 Thin Films Prepared, by Metalorganic Decomposition Method, Applied Physics Letters, vol. 85, No. 7, 2004, pp. 1214-1216.
Hu, et al., Growth and Ellipsometric Characterizations of Highly (111)-Oriented Bi2Ti2O7, Films on Platinized Silicon by Metal Organic Decomposition Method, J. Vac. Sci. Technol. A, vol. 262 No. 5, 2008, pp. 1287-1292.
Hwang, et al., Photocatalytic Hydrogen Production from Water over M-Doped La2Ti2O7 (M=Cr, Fe) under Visible Light Irradiation {I > 420 nm), J. Phys. Chem. B, vol. 109, 2005, pp. 2093-2102.
Ji, et al., Photocatalytic Hydrogen Production from Water-Methanol Mixtures Using N-Doped Sr2Nb2O7 under Visible Light Irradiation: Effects of Catalyst Structure, Phys . Chem. Chem. Phys., vol. 7, 2005, pp. 1315-1321.
Kahlenberg, et al., On the Existence of a Pyrochlore-type Phase in the System Bi2O3—TiO2, Cryst. Res. Technol., vol. 30, No. 2, 1995, pp. 237-241.
Kar, etal., Improved Photocata lytic Degradation of Textile Dye Using Titanium Dioxide Nanotubes Formed Over Titanium Wires, Environ. Sci. Technol., vol. 43, 2009, pp. 3260-3265.
Kim etal., An Undoped, Single-Phase Oxide Photocatalyst Working under Visible Light, J. Am. Chem. Soc. vol. 126, 2004, pp. 8912-8913.
Li, et al., Photocatalytic Hydrogen Production from Aqueous Methanol Solutions under Visible Light over Na{BixTa1-x) O3 Solid-Solution, International Journal of Hydrogen Energy, vol. 34, 2009, pp. 147-152.
Martyanov, et al., Structural Defects Cause TiO2-Based Photocatalysts to be Active in Visible Light, Chem. Commun., 2004, pp. 2476-2477.
Miyauchi et al., Photocatalysis and Photoinduced Hydrophilicity of Various Metal Oxide Thin Films, Chem. Mater., vol. 14, 2002, pp. 2812-2816.
Perdew, et al., Generalized Gradient Approximation Made Simple, Physical Review Letters, vol. 77, No. 18, 1996, pp. 3865-3868.
Radosavljevic, et al., Synthesis and Structure of Pyrochlore-Type Bismuth Titanate, Journal of Solid State Chemistry, vol. 136, 1998, pp. 63-66.
Scaife, Oxide Semiconductors in Photoelectrochemical Conversion of Solar Energy, Solar Energy, vol. 25, pp. 41-54.
Segall, et al., First-Principles Simulation: Ideas, Illustrations and the CASTEP Code, J. Phys.: Condens. Matter vol. 14, 2002, pp. 2717-2744.
Seshadri, Lone Pairs in Insulating Pyrochlores: Ice Rules and High-K Behavior, Solid State Sciences, vol. 8, 2006, pp. 259-266.
Shimada, et al., Crystal Growth of Bismuth Titanates and Titanium Oxide From Melts in the System Bi2O3—V2O5—TiO2, Journal of Crystal Growth, vol. 41, 1977, pp. 317-320.
Sivalingam, et al., Photocatalytic Degradation of Various Dyes by Combustion Synthesized Nano Anatase TiO2, Applied Catalysis B: Environmental, vol. 45, 2003 pp. 23-38.
Sohn, et al., Electrochemically Assisted Photocatalytic Degradation of Methyl Orange Using Anodized Titanium Dioxide Nanotubes, Applied Catalysis B: Environmental vol. 84, 2008, pp. 372-378.
Subramanian et al., Catalysis with TiO2/Gold Nanocomposites. Effect of Metal Particle Size on the Fermi Level Equilibration, J. Am. Chem. Soc, vol. 126, 2004, pp. 4943-4950.
Subramanian et al., Synthesis and UV-Visible-Light Photoactivity of Noble-Metal-SrTiO3 Composites, Ind. Eng. Chem. Res., vol. 45, 2006, pp. 2187-2193.
Subramanian, et al., Oxide Pyrochlores—A Review, Prog. Solid St. Chem. vol. 15, 1983, pp. 55-143.
Vilette, et al., High-Temperature Plasticity of Cubic Bismuth Oxide, J. Mater. Res., vol. 11, No. 6,1996, pp. 1433-1439.
Wang, et al., Photophysical and Photocatalytic Properties of Three Isostructural Oxide Semiconductors In6NiTi6O22, In3CrTi2O10, and In12NiCr2Ti10O42 with Different 3d Transition Metals, J. Phys. Chem. C, vol. 111, 2007, pp. 12848-12854.

(56) References Cited

OTHER PUBLICATIONS

Xiao, et al., Preparation and Properties of Bi2Ti207 Thin Films by Chemical Solution Deposition, Materials Research Bulletin, vol. 36, 2001, pp. 1949-1956.

Yang, et al., The Role of Photoinduced Defects in Ti02 and Its Effects on Hydrogen Evolution from Aqueous Methanol Solution, J. Phys. Chem. A, vol. 112, 2008, pp. 10784-10789.

Yao, et al., Photocatalytic Property of Bismuth Titanate Bi12TiO20 crystals, Applied Catalysis A: General, vol. 243, 2003, pp. 185-190.

Yao, et al., Photocatalytic Property of Bismuth Titanate Bi2Ti207, Applied Catalysis A: General, vol. 259, 2004, pp. 29-33.

Yao, et al., Photocatalytic Property of Perovskite Bismuth Titanate, Applied Catalysis B: Environmental, vol. 52, 2004, pp. 109-116.

Yao, et al., Photocatalytic Property of Zn-Modified Bismuth Titanate, Journal of Molecular Catalysis A: Chemical, vol. 198, 2003, pp. 343-348.

Zen, et al., A Dual Electrochemical Sensor for Nitrite and Nitric Oxide, Analyst, vol. 125, 2000, pp. 2169-2172.

Zeng, et al., Hydrothermal Synthesis and Photocatalytic Properties of Pyrochlore La2Sn207 Nanocubes, J. Phys. Chem. C, vol. 111, 2007, pp. 11879-11887.

Zhou, et al., Synthesis, Characterization, and Photocatalytic Properties of Pyrochlore Bi2Ti207 Nanotubes, J. Mater. Res., vol. 21, No. 11, 2006, pp. 2941-2947.

\* cited by examiner

SYNTHESIS OF PYROCHLORE NANOSTRUCTURES AND USES THEREOF

CROSS-REFERENCE TO RELATED APPLICATIONS

This application is a divisional application of, and incorporates by reference, U.S. patent application Ser. No. 13/105,102, filed May 11, 2011 which in turn claims the benefit of U.S. Provisional Application No. 61/333,463, filed May 11, 2010, which is hereby incorporated by reference herein in its entirety.

TECHNICAL FIELD

The present invention relates generally to pyrochlore nanostructures and, more specifically, to synthesis of pyrochlore nanorods, such as bismuth titanate pyrochlore nanorods, and uses thereof.

BACKGROUND

Photocatalytic hydrogen production is a possible answer to the present energy crisis. However, efficient hydrogen production requires the development of materials that demonstrate tunable optical response, have UV-visible activity, and are amenable to synthesis using simple methods. Metal oxides, mainly titanium dioxide ($TiO_2$), have been studied for photocatalytic applications. Fujishima et al., *Nature* 1972, 238, 37; Hoffmann et al., *Chem. Rev.* 1995, 95, 69. However, decades of work with $TiO_2$, such as to improve its properties via doping and addition of other photoactive materials, has demonstrated only incremental improvements. Martyanov et al., *Chem. Commun.,* 2004, 2476; Anpo et al., *J. Catal.,* 2003, 216, 505.

Pyrochlores ($A_2B_2O_7$) are a lesser studied family of compounds that offer the flexibility to tune photocatalytic properties. Bismuth titanate (BTO), $Bi_2Ti_2O_7$, is a photoactive member of the pyrochlore family that can potentially meet the aforementioned objectives desired of a photocatalyst. However, the full potential of this photocatalyst for hydrogen generation has not yet been fully exploited, which is partially because attempts to synthesize and characterize stoichiometric BTO pyrochlore are far and few. The earlier adopted synthesis methods have not always resulted in a pure pyrochlore phase. Yao et al., *Appl. Catal. B Environ.* 2004, 52, 109; Yao et al., *Appl. Catal. A. Gen.* 2003, 243, 185; Yao et al., *J. Mol. Catal. A.* 2003, 198, 343. For example, Radosavljevic et al. reported a method that resulted in a Bi—Ti—O composition of the form $Bi_{1.74}Ti_2O_{6.62}$. Radosavljevic et al., *J. Solid State Chem.* 1998, 136, 63. Hector and Wiggin reported the synthesis and structural study of stoichiometric BTO along with some impurities of $Bi_4Ti_3O_{12}$ using a co-precipitation method. Hector et al., *J. Solid State Chem.* 2004, 177, 139.

Recently, attempts to prepare stable crystalline BTO with a nanotube structure using anodized alumina as a template have been reported. Zhou et al., *J. Mater. Res.* 2006, 21, 2941. A template method, however, requires template removal, which is an additional step. To synthesize these materials economically on a large scale requires the development of a template-free method.

Accordingly, a need exists for new template-free methods of synthesizing pyrochlore nanostructures, such as pyrochlore nanorods.

SUMMARY OF THE INVENTION

According to one embodiment of the invention, a method of synthesizing a pyrochlore nanostructure having the general formula $A_2B_2O_7$, where A and B are rare-earth or transition metal species and O is oxygen, is provided. The method includes separately mixing together a first acid stabilized aqueous solution including a pyrochlore precursor A and a second acid stabilized aqueous solution including a pyrochlore precursor B with an organic solvent mixture including a surfactant and an organic solvent to form a first acid stabilized oil-in-water emulsion of precursor A and a second acid stabilized oil-in-water emulsion of precursor B. Next, equimolar portions of the first and second acid stabilized oil-in-water emulsions are mixed together to form a mixed acid stabilized oil-in-water emulsion including the pyrochlore precursor A and the pyrochlore precursor B. Then, the mixed acid stabilized oil-in-water emulsion is treated with a base to increase the pH from acidic to alkaline to produce a precipitate including the pyrochlore precursors A and B. The precipitate is isolated then calcined in the presence of oxygen to form the pyrochlore nanostructure, wherein the method of synthesizing the pyrochlore nanostructure is template-free.

According to another embodiment of the invention, a pyrochlore nanostructure having the general formula $A_2B_2O_7$ is provided wherein A is bismuth (Bi), calcium (Ca), strontium (Sr), yttrium (Y), barium (Ba), lanthanum (La), or combinations thereof; B is titanium (Ti), vanadium (V), chromium (Cr), manganese (Mn), iron (Fe), nickel (Ni), zirconium (Zr), tin (Sn), hafnium (Hf), tantalum (Ta), tungsten (W), or combinations thereof; and O is oxygen; and wherein the nanostructure has a spherical or rod shape.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

In accordance with embodiments of the invention, a template-free reverse micelle (RM) based method is used to synthesize pyrochlore nanostructures having photocatalytic activity. For purposes herein, a pyrochlore is a chemical compound characterized by the general formula $A_2B_2O_7$, where A and B can be rare-earth or transition metal species, as further discussed in more detail below, and O is oxygen.

Figure 1A:
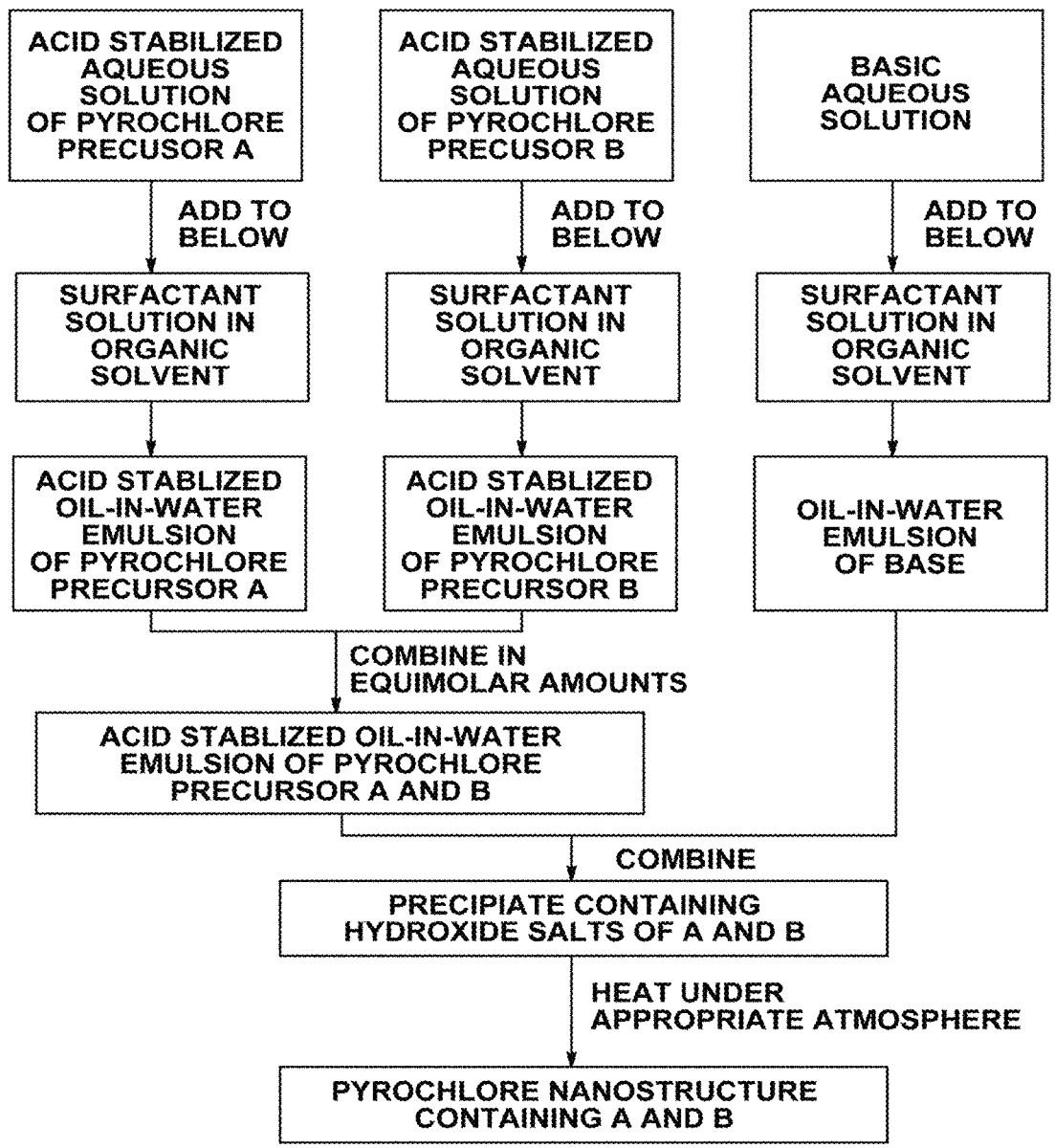
FIG. 1A is a schematic representation of a reverse micelle (RM) based template-free method for synthesizing pyrochlore nanostructures in accordance with an embodiment of the invention.

With reference to FIG. 1A, a general method of synthesizing pyrochlore nanostructures having the general formula $A_2B_2O_7$ includes separately mixing together a first acid stabilized aqueous solution including pyrochlore precursor A and a second acid stabilized aqueous solution including pyrochlore precursor B with an organic solvent mixture including a surfactant and an organic solvent to form an acid stabilized oil-in-water emulsion. Equimolar portions of the first and second acid stabilized aqueous solutions then are mixed together to form a mixed acid stabilized oil-in-water emulsion of the pyrochlore precursor A and the pyrochlore precursor B. The mixed acid stabilized oil-in-water emulsion is next mixed with a base to raise the pH from acidic to alkaline. According to one embodiment, the base may be a basic oil-in-water emulsion, which is prepared by mixing together a basic aqueous solution with an organic solvent mixture including a surfactant and an organic solvent. Mixing the basic oil-in-water emulsion with the mixed acid stabilized oil-in-water emulsion produces a precipitate including the pyrochlore precursors A and B. In other words, the mixed acid stabilized oil-in-water emulsion is treated with the basic oil-in-water emulsion to raise the pH from acidic to alkaline (e.g., pH>7), which promotes and/or induces the formation of the precipitate including hydroxide salts containing A and B in the desired equimolar ratio. The precipitate is isolated and dried. Upon heating the precipitate to elevated temperatures in the presence of oxygen, a pyrochlore nanostructure, such as a pyrochlore nanorod, is formed without the use of a template.

According to embodiments of the present invention, suitable examples of A of pyrochlore precursor A can include the following elements: bismuth (Bi), calcium (Ca), strontium (Sr), yttrium (Y), barium (Ba), lanthanum (La), and the like, and combinations thereof. Suitable examples of B of pyrochlore precursor B can include the following elements: titanium (Ti), vanadium (V), chromium (Cr), manganese (Mn), iron (Fe), nickel (Ni), zirconium (Zr), tin (Sn), hafnium (Hf), tantalum (Ta), tungsten (W), and the like, and combinations thereof.

According to embodiments of the present invention, suitable acids include hydrochloric acid (HCl), nitric acid ($HNO_3$), acetic acid ($CH_3CO_2H$), sulfurous acid ($H_2SO_3$), formic acid ($HCO_2H$), perchloric acid ($HClO_4$), and the like. Generally, the selected acid should facilitate dissolution of the pyrochlore precursors A and B.

According to embodiments of the present invention, the organic solvent mixture includes a surfactant, which generally can be an anionic, nonionic, or cationic surfactant. Anionic surfactants can be based on sulfate, sulfonate, phosphinate, or carboxylate anions. Exemplary anionic surfactants include, but are not limited to, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (also known as sodium lauryl ether sulfate (SLES)), sodium dodecyl benzene sulfonate (SDBS), alkyl benzene sulfonate, soaps, or fatty acid salts, sodium di(n-octyl) phosphinate, and the like. Nonionic surfactants can include poly(oxyethylene)(4) lauryl ether (Brij® 30), sorbitan monolaurate (Span® 80), and the like. And cationic surfactants can include tetradecyl dimethyl benzyl ammonium chloride (TDMBAC), cetyltrimethylammonium bromide (CTMAB), tetradecyltrimethylammonium bromide (Triton® N-42), and the like. The organic solvent may be, for example, an alkane such as iso-octane, heptane, n-decane, cyclohexane, toluene, decaline, dodecane, and the like; an alkanol such as n-butanol to n-dodecanol, and the like; or an alkanone such as cyclopentanone, cyclohexanone, cycloheptanone, and the like.

According to embodiments of the present invention, the base includes ammonium hydroxide ($NH_4OH$), potassium hydroxide (KOH), sodium hydroxide (NaOH), ammonia ($NH_3$) gas, and the like. The base may be dissolved in water to provide the basic aqueous solution.

With respect to the ratio between the water of the first and second acid stabilized aqueous solutions and the surfactant solution, the ratio may range from 4 to 40 v/v. In another example, the ratio may range from 10 to 20 v/v. In yet another example, the water to surfactant solution ratio is about 15 v/v. Depending upon the ratio, different sizes and shapes of the resulting hydroxide precipitate may be obtained. As such, a method of controlling the size and shape of the hydroxide precipitate of pyrochlore precursors A and B includes controlling the water to surfactant solution ratio of the acid stabilized oil-in-water emulsion pyrochlore precursors and/or the mixed acid stabilized oil-in-water emulsion pyrochlore precursors.

Similarly, controlling the ratio of the water to surfactant solution for the base (e.g., $NH_4OH$) also facilitates control of the size and shape of the hydroxide precipitate of pyrochlore precursors A and B. For example, the ratio may range from 4 to 40 v/v. In another example, the ratio may range from 10 to 20 v/v. In yet another example, the water to surfactant ratio of the base is about 15 v/v.

The independent mixing together of the acid stabilized aqueous solutions of pyrochlore precursors A and B with the organic solvent mixture to form separate oil-in-water emulsions may be accomplished by any suitable means known to those skilled in the art. According to one embodiment, mixing can include ultrasonicating the oil-in-water emulsions. Without being bound by any particular theory, it is believed that ultrasonication of each of the solutions initiates the formation of colloid solutions of a reverse micelle. Ultrasound mixing may also be used when the two acid stabilized solutions are combined together, and upon subsequent treatment thereof with the base.

The precipitate may be collected by the customary methods such as filtration or centrifugation. The precipitate may be washed with DI water and dried to substantially remove volatiles. For example, the precipitate may be heated overnight in air at 100° C. After drying, the precipitate is subjected to further heating at various temperatures to affect carbonization of residual organics and calcinations so as to form the desired pyrochlore nanostructures, such as pyrochlore nanorods.

The following descriptions serve to provide exemplary embodiments of the invention.

Figure 1B:
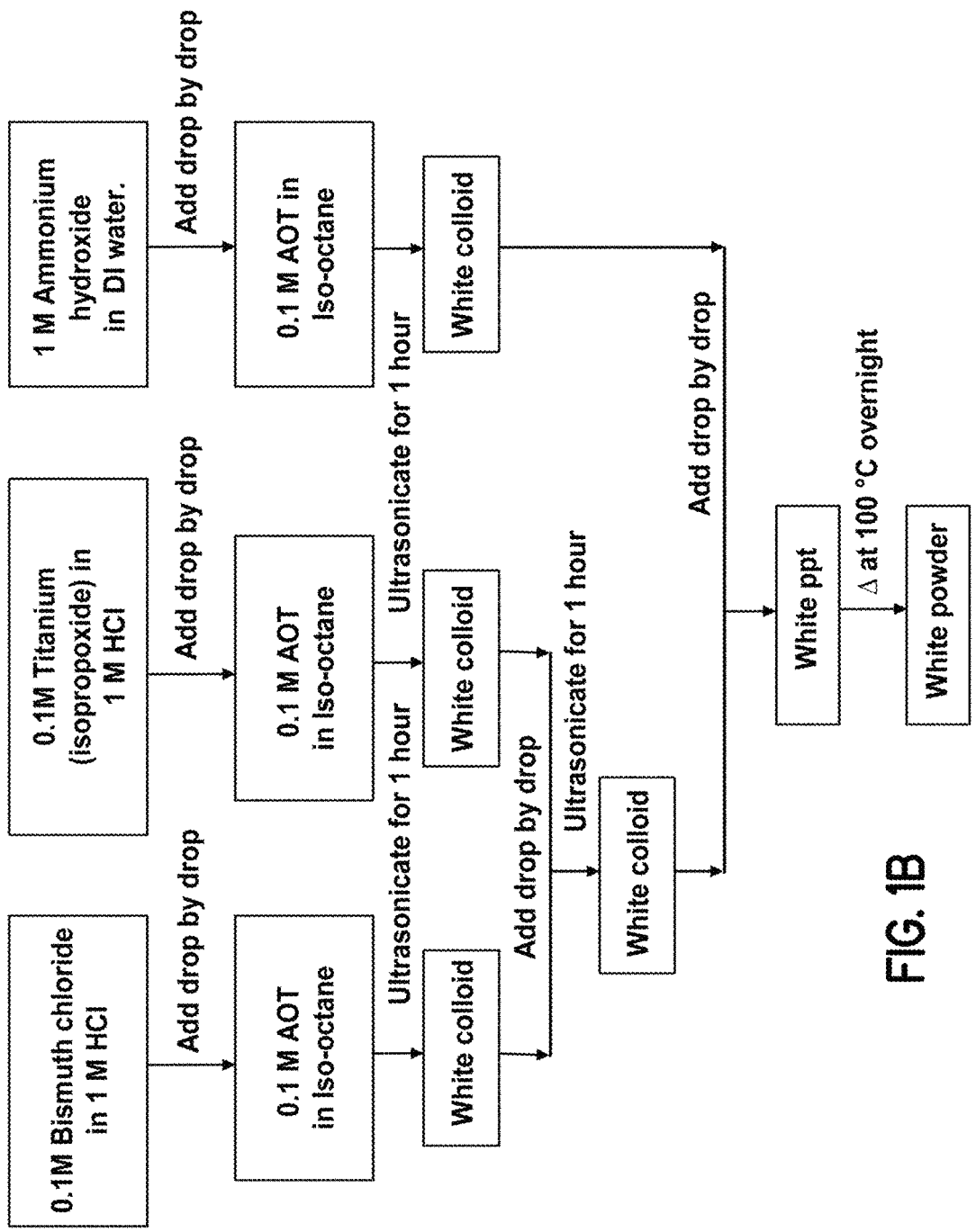
FIG. 1B is a schematic representation of a reverse micelle (RM) based template-free method for synthesizing bismuth titanate pyrochlore nanorods in accordance with an embodiment of the invention.

With specific reference now to FIG. 1B, an acid stabilized equimolar aqueous solution of a bismuth precursor, i.e., precursor A of $A_2B_2O_7$, and an acid stabilized equimolar aqueous solution of a titanium precursor, i.e., precursor B of $A_2B_2O_7$, are separately prepared. In particular, each of a 0.1M bismuth chloride in 1M HCl solution (acid stabilized aqueous solution of pyrochlore precursor A) and a 0.1M titanium isopropoxide in 1M HCl solution (acid stabilized aqueous solution of pyrochlore precursor B) is prepared. Other bismuth salts may be utilized in place of the $BiCl_3$ salt including bismuth nitrate, bismuth fluoride, bismuth iodide, bismuth oxychloride, and the like. In addition, other titanium precursors may utilized including titanium(IV) (triethanolaminato) isopropoxide, titanium(IV) bis(ethyl acetoacetato)diisopropoxide, titanium(IV) oxyacetylacetonate, titanium(IV) oxychloride-hydrochloric acid solution, titanium(IV) oxysulfate-sulfuric acid solution, titanium(IV) tert-butoxide, and the like. And HCl may be replaced by other acids including, for example, nitric acid ($HNO_3$), acetic acid ($CH_3CO_2H$), sulfurous acid ($H_2SO_3$), formic acid ($HCO_2H$), perchloric acid ($HClO_4$), and the like.

Next, each of the acid stabilized oil-in-water emulsions of bismuth and titanium can be prepared by using a surfactant such as sodium bis(2-ethylhexyl) sulphosuccinate (AOT) in iso-octane. According to one example, a 0.1M AOT in iso-octane solution is prepared. The bismuth solution and the titanium solution are added drop wise to its own AOT-iso-octane solution.

According to this example, 75 ml of 0.1 M Ti salt solution is added to 5 ml of 0.1M AOT and 75 ml of 0.1 M Bi salt solution added to 5 ml of 0.1M AOT, which provides a water to surfactant solution ratio of 15 v/v. One (1) hour of ultrasonication of each of the combined solutions initiates the formation of white colloid solutions of the reverse micelle. Ultrasound was used for vigorous mixing and to ensure the transport of the materials across the reverse micelles. Equal amounts of each of the bismuth and titanium white colloid solutions then are added together drop wise and ultrasonicated for one (1) hour.

A 1M ammonium hydroxide in 0.1M AOT-iso-octane solution (oil-in-water emulsion of base) is also separately prepared and sonicated for 1 hr to initiate formation of a white colloid solution of the reverse micelle. In particular, 75 ml of 1 M $NH_4OH$ (basic aqueous solution) is added to 5 ml of 0.1M AOT (surfactant solution in organic solvent), which also provides a water to surfactant solution ratio of 15 v/v. Aside from $NH_4OH$, KOH, NaOH, $NH_3$ gas, and the like may be used to provide a basic solution. This solution is added drop wise to the combined acid stabilized bismuth and titanium oil-in-water emulsions to increase the pH from acidic to alkaline (pH=9.5), thereby causing a white precipitate to form. The precipitate includes the bismuth salt and titanium salt from the reverse micelle configuration. The precipitate is collected, washed with DI water, and dried by heating overnight in air at 100° C. to form a white powder of the hydroxide of Bi—Ti in the fixed combination of ratio from the synthesis.

Figure 2A:
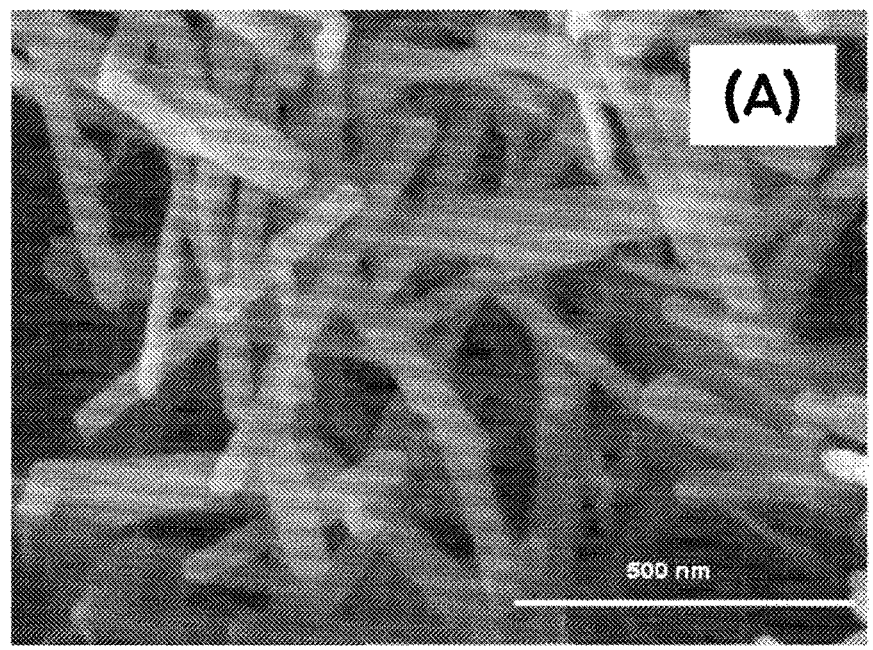
FIG. 2A is a scanning electron microscope (SEM) image of bismuth titanate (BTO) calcined at 650° C.

With further reference now to FIGS. 2A-2D, and FIG. 3, overnight drying was followed by carbonization in nitrogen at 350° C. and further followed by calcination of the powder in oxygen at various temperatures. Calcination in the presence of oxygen at 500° C. leads to the formation of spherical nanoparticles with a diameter of about 20 nm. When the nanoparticles are further calcined at 650° C., they rearrange to form a rod-shaped morphology having good uniformity, with narrow size distribution, and an aspect ratio of about 1:10 (FIG. 2A).

Figure 2B:
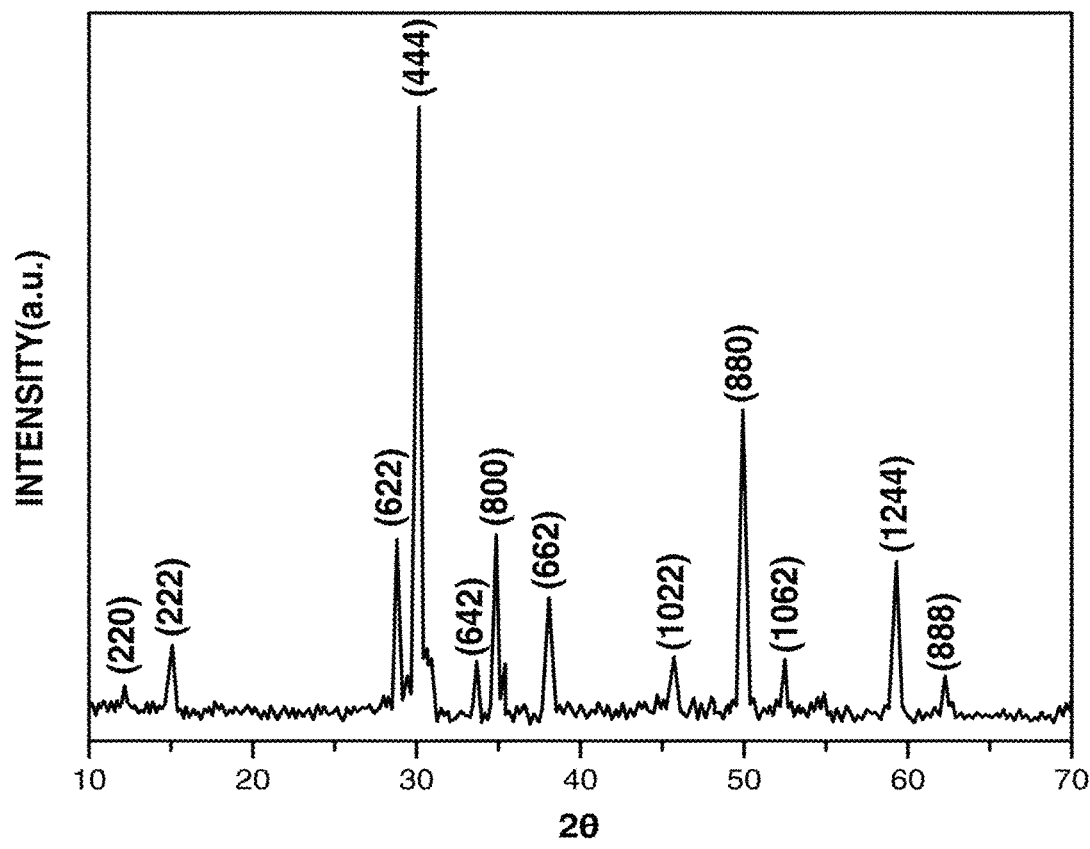
FIG. 2B is an x-ray powder diffraction (XRD) pattern of the BTO.

FIG. 2B shows the X-ray diffraction (XRD) pattern of the nanorods formed by calcination at 650° C. The nanorods are identified as crystalline cubic $Bi_2Ti_2O_7$ with a space group of Fd3m and the lattice parameters a=b=c=20.68 Å (JCPDS #32-0118). X-ray diffraction (XRD) was performed using a Philips APD 1740 system equipped with a graphite crystal monochromator and $CuK\alpha$ radiation ($\lambda$=1.54 Å) between the ranges of 20° to 80°=2θ. XRD was carried out using specially obtained polished quartz cut 6° from (0001) crystal plane with a cavity of dimension 3 mm diameter and 1 mm depth (Gem Dugout X-ray Diffraction Products).

Figure 2C:
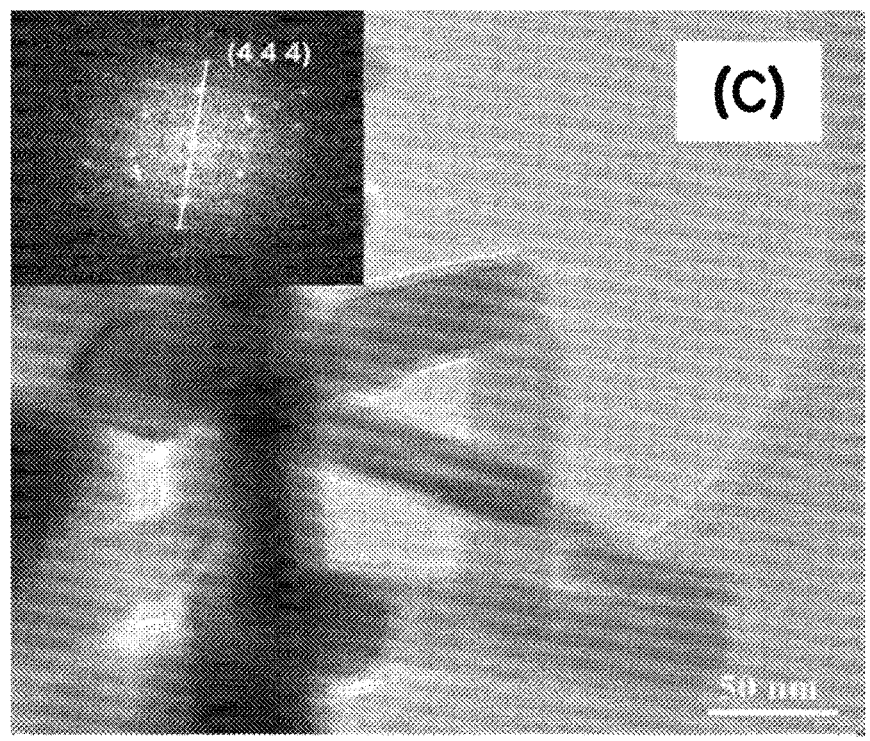
FIG. 2C is a high resolution transmission electron microscopy (HRTEM) image of the BTO nanorods and the inset is a selected area electron diffraction (SAED) pattern of the BTO nanorods.

FIG. 2C shows a high resolution transmission electron microscopy (HRTEM) image of the BTO nanorods. The rods have a diameter of about 40-50 nm and a length from about 400-500 nm. Selected area electron diffraction pattern (SAED) shows that the nanorods have a (4 4 4) orientation. The Energy-Dispersive Spectroscopy (EDS) spectrum of BTO nanorods shows the presence of Bi, Ti and O. Bi and Ti have identical atomic concentration.

Figure 2D:
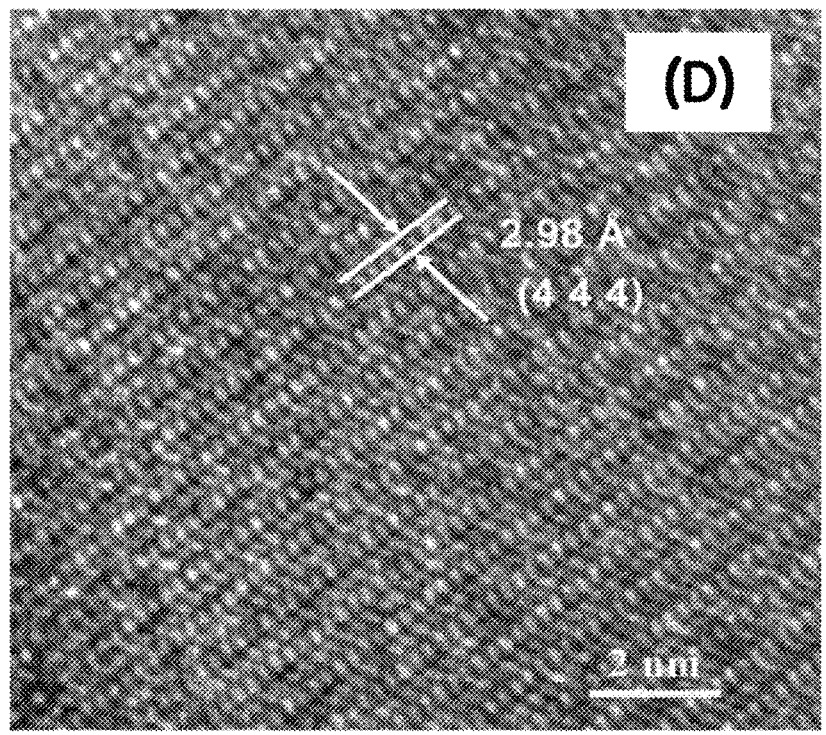
FIG. 2D. is an fast Fourier transformation high resolution transmission electron microscopy (FFT-HRTEM) image of the BTO.
Figure 3:
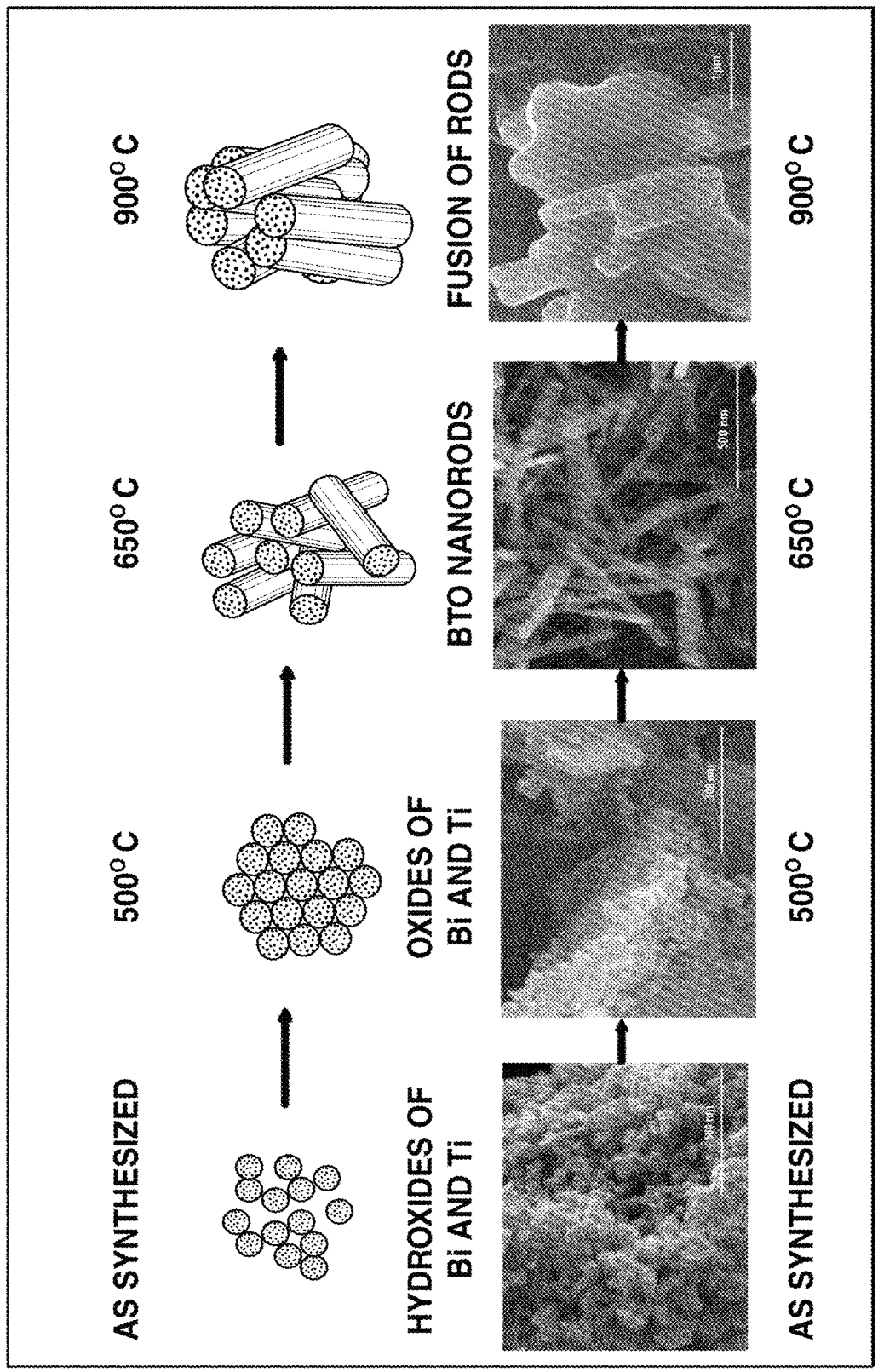
FIG. 3 is a schematic representation with SEM images of the BTO showing the morphology change at various calcination temperatures.

FIG. 2D shows a high resolution Fast Fourier Transformation (FFT)-HRETM image of the BTO pyrochlore nanorods with the (4 4 4) orientation as well. From the HRTEM, EDS, and SAED analysis, it can be concluded that the nanorods are pure crystalline pyrochlore BTO. Further, the BTO nanoparticles are about 10 times smaller in size compared to the smallest particles reported previously.

The formation of BTO nanorods can be hypothesized as a solid-phase reaction with a three-step mechanism as follows.

(1) Transport of Reactants to the Reaction Zone:

Hydroxides of bismuth and titanium precipitated in the microemulsion constitute the reaction zone. The formation of respective oxides is facilitated by calcination in oxygen at 500° C. The presence of $Bi_2O_3$ and $TiO_2$ is evident from XRD. $Bi_2O_3$ present in the reaction zone can become more reactive by the phase transformation from monoclinic to cubic with increase in temperature. This reactive $Bi_2O_3$ leads to the formation of solid solution with $TiO_2$ at 650° C., as is evident from the phase diagram of $Bi_2O_3$ and $TiO_2$.

(2) Nucleation of New Phase:

The solid solution formed in the reaction zone leads to the creation of a new phase in the pyrochlore crystal structure, which is also evident from the XRD data (FIG. 2B).

(3) Growth of the New Phase:

Variation in growth with temperature can be attributed to the differences in the free energy of formation of the BTO. A preference for growth along the (1 1 1) direction is noted from XRD. In this orientation, the pyrochlore has a thermodynamically most favorable low free energy of formation. The growth of the crystalline nanorods in the pyrochlore phase is confirmed from the XRD (FIG. 2B) and FFT-HRTEM lattice pattern (FIG. 2D). A "d-spacing" value at 2.98 Å corresponding to the high intensity (4 4 4) is noted from the XRD analysis. This represents growth along the (1 1 1) direction after calcination at 650° C.

The nanorods formed at 650° C. in the pyrochlore phase are thermally stable up to 750° C. Increasing the temperature beyond 750° C. causes the nanorods to fuse together to form an aggregate as seen from FIG. 3. A conventional solid state reaction was also performed by taking a physical mixture of $Bi_2O_3$ and $TiO_2$ powders in stoichiometric ratio and then calcining in oxygen at 650° C. for 6 h. The resulting material did not yield a pyrochlore phase. This indicates the existence of a synergism between the nanoparticle nucleation in the RM environment, growth, and the calcination temperature. These parameters appear to play a role in the evolution of the particle size, shape, and pyrochlore phase formation.

Figure 4:
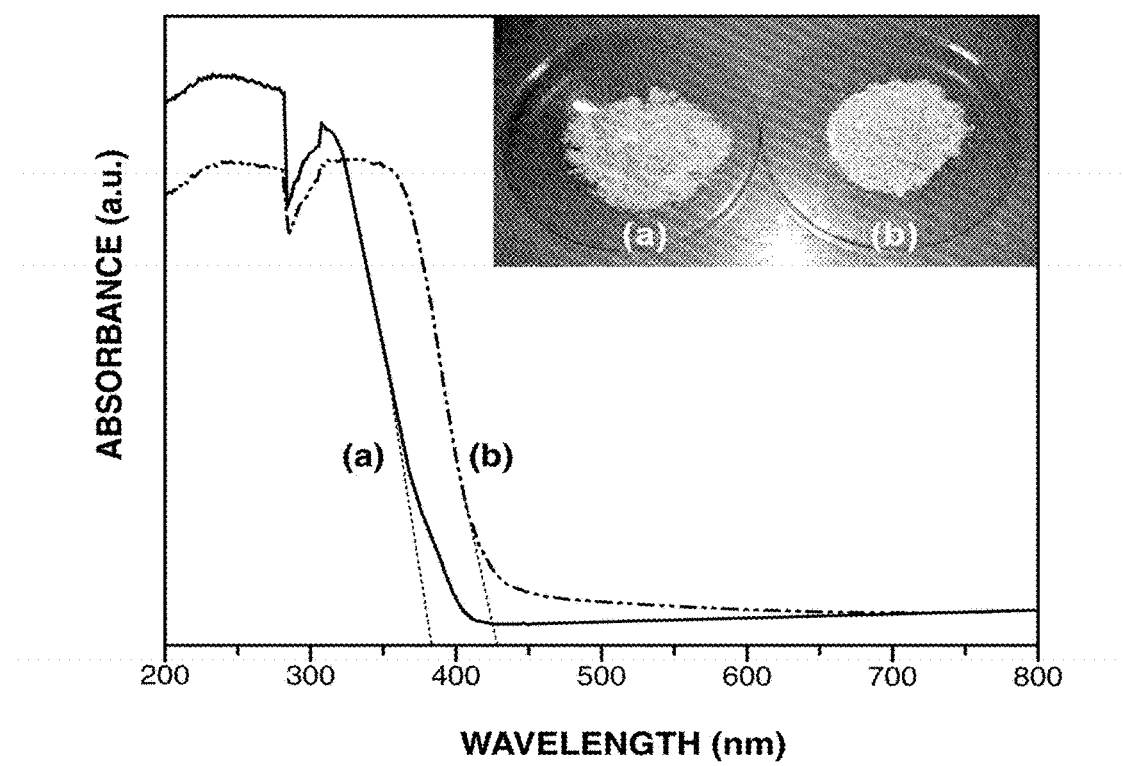
FIG. 4 is a comparison of the diffuse reflectance (DR) measurements of commercial (a) $TiO_2$ (P-25) with (b) BTO nanorods. The inset shows pictures of the (a) $TiO_2$ (P-25) with (b) BTO.

With reference to FIG. 4, optical measurements were conducted to examine the visible light response of BTO nanorods formed at 650° C. The DRUV-vis spectra of BTO nanorods display a marked red shift in the onset absorbance by 48 nm than $TiO_2$ (commercial Degussa P-25). The absorbance in the visible light is not at a significant loss in UV absorbance which is typically true for transition metal doped $TiO_2$. The inset of FIG. 4 shows the color of BTO as pale yellow.

Figure 5:
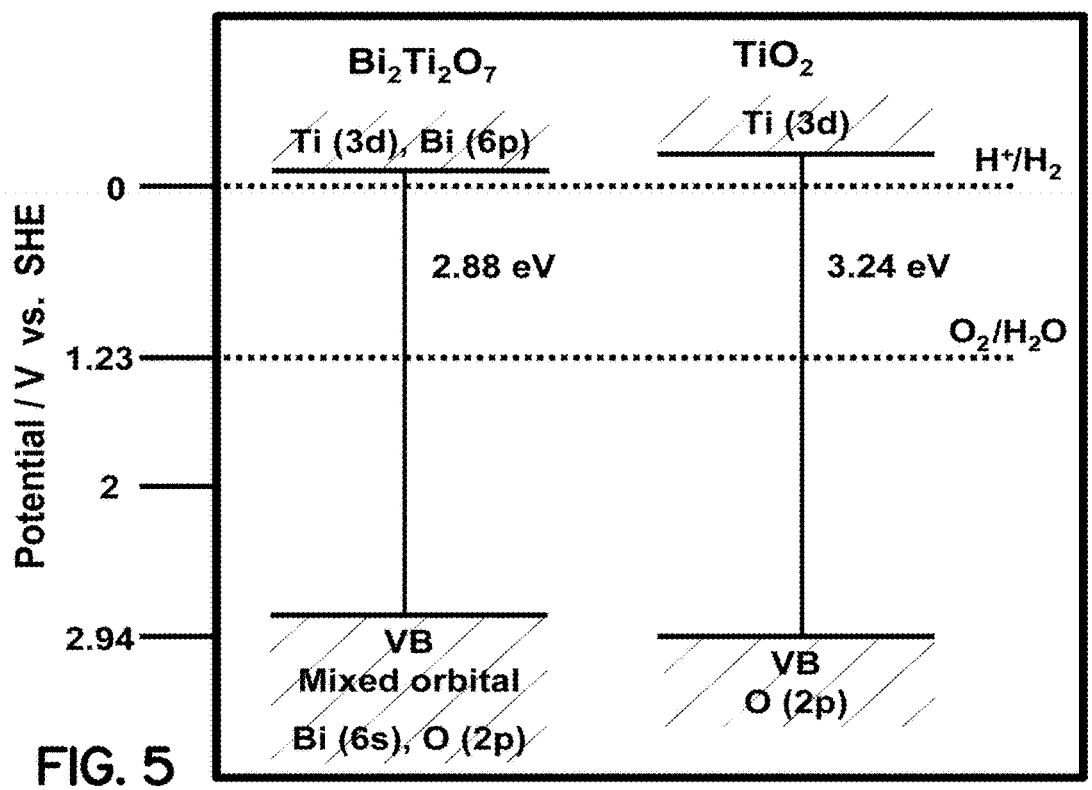
FIG. 5 is a schematic representation of band edges of BTO pyrochlore nanorods and $TiO_2$ from diffuse reflectant (DR) UV-vis and density functional theory (DFT) calculations.

With reference to FIG. 5, Density Functional Theory (DFT) calculations were carried out to determine the Partial Density of States (PDOS) of BTO. Plane wave based Density Functional Theory (DFT) calculations were use to analyze the electronic property of the BTO. CASTEP program present in the Materials Studio® package supplied by Accelrys® was used for modeling. Plane wave functionalized ultrasoft pseudopotentials were used with a kinetic energy cutoff of 300 eV. The Generalized Gradient Approximation (GGA) with Perdew-Wang exchange and correlation functional (PW91) has been adopted. BTO with a pyrochlore crystal structure has been obtained from ICSD (ICSD #413013). All the BTO properties have been calculated by utilizing a primitive unit cell of the BTO pyrochlore crystal structure. To compare the properties of BTO, anatase $TiO_2$ (ISCD #82080) has been considered as a standard. A reduction in the band gap of about 0.4 eV compared to anatase $TiO_2$ crystal was evident from PDOS plots determined from the DFT calculation of BTO pyrochlore and $TiO_2$ anatase. This band gap reduction and shift of valence band is due to the contribution of 6s electrons from $Bi^{3+}$. The schematic representation of band positions of BTO has also been plotted against the water redox potential by using band gap calculated from DRUV-vis data. Thus, the DFT calculations complement the experimental bandgap estimates.

Figure 6:
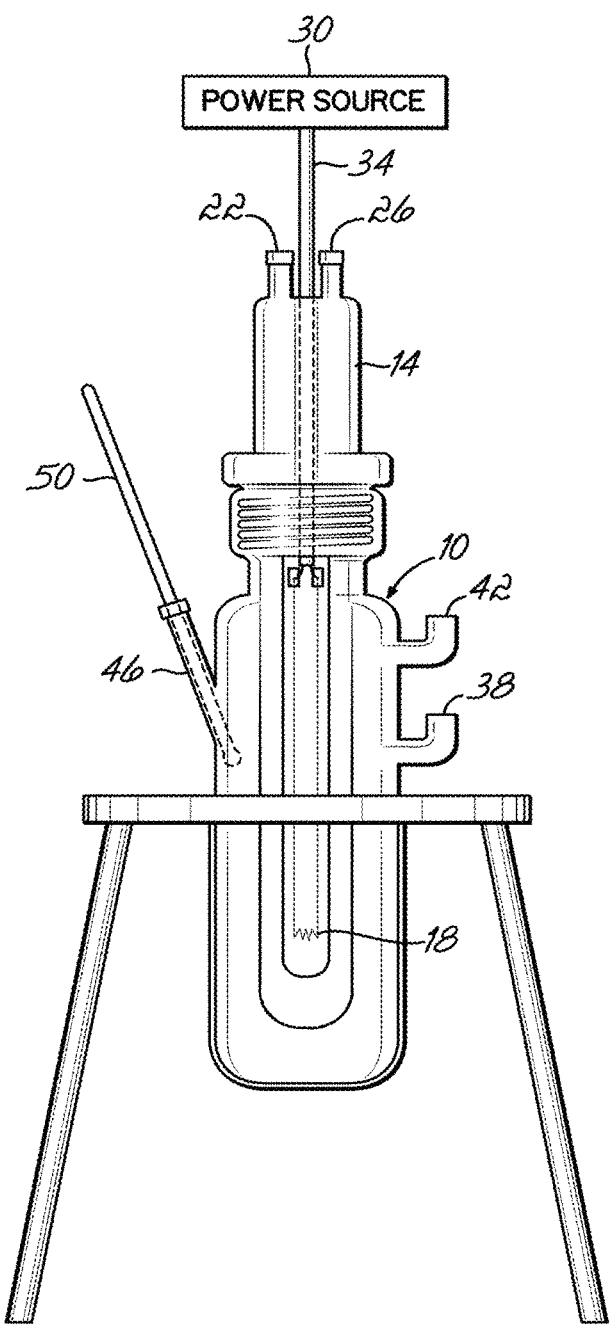
FIG. 6 is a photochemical reactor set-up used to study the hydrogen evolution reaction.

With respect to Table 1 below, the applicability of the BTO nanorods as a potential photocatalyst for splitting water to produce hydrogen was examined. In particular, photo catalytic hydrogen generation experiments were performed in a slurry type photochemical reactor (See FIG. 6) supplied by Ace Glass, Vineland, N.J. The part number of the complete reactor setup is 7840-340. The major parts of the setup, as shown in the FIG. 6, include a reactor 10, a concentric quartz tube 14 (Ace Glass part #7854) that is adapted to house a lamp 18 and fits inside the reactor 10. The concentric quartz tube 14 includes a cooling water inlet 22 and a cooling water outlet 26 and is designed to circulate water for maintaining the temperature of the reaction mixture, where the water flows between the lamp and the contents of the reactor. The lamp 18 is connected to a power source 30 by an electrical connector 34. The reactor 10 further includes a reactant addition port 38, which permits the introduction of reactants into the reactor 10, and a gas outlet port 42, which permits sampling reaction gases. The reactor 10 may further include additional features such as a temperature measuring port 46 and thermometer 50.

In this experiment, 150 mg of the photocatalyst (BTO as well as $TiO_2$) was weighed and introduced into the reactor. 300 ml of methanol-water mixture was prepared in the ratio of 1:5. The reaction mixture was bubbled with nitrogen for 30 min to remove dissolved oxygen before illuminating the system. The lamp was introduced into the annulus of the reactor at the location shown in FIG. 6. Cold tap water was circulated around the lamp to maintain the temperature of the reaction. The gases evolved were collected through the outlet of the reactor. A gas sampling tube with a rubber cork was used to collect gas from the outlet. A gas chromatograph (GC) was used to identify the gases evolved. The GC was calibrated using high purity (>99.995) hydrogen. The collected gas was analyzed using a HP 6890 GC system with a TCD detector. A precision Hamilton® needle was used to remove representative sample of the gas from the sampling tube and injected into the GC. A molecular sieve capillary column HP-PLOT 5 A, 30 m, 0.32 mm, 25 µm was used to determine the concentration of hydrogen.

Figure 7:
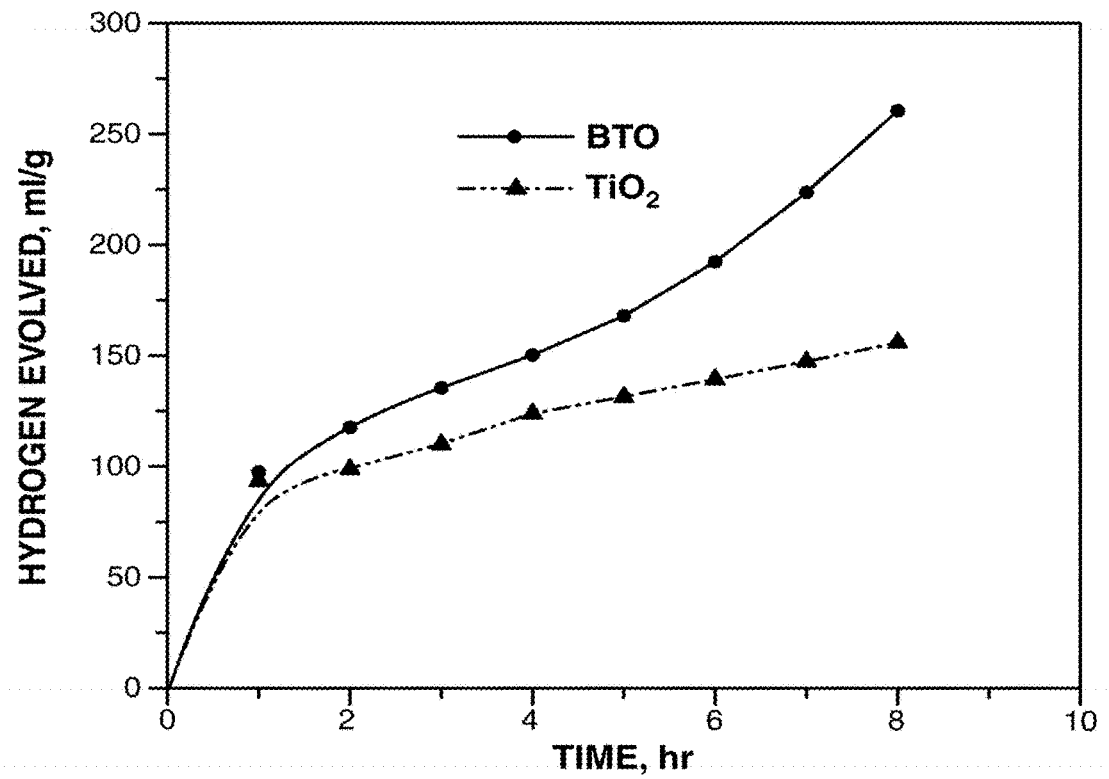
FIG. 7 is a graph of time based hydrogen evolution data following UV-vis illumination of a methanol water solution (1:5 ratio) containing the photocatalysts.

With reference to FIG. 7, as well as Table 1, the results show that bare BTO nanorods demonstrate almost twice the hydrogen evolution of $TiO_2$. All the experiments were performed using identical mass of BTO and $TiO_2$. The activity of the bare BTO can be further enhanced by suitable substitution of different elements, either at the A site or B site of the flexible $A_2B_2O_7$ structure. Alternately, the addition of a co-catalyst such as Pt or NiO can further enhance the hydrogen generation activity.

TABLE 1

Comparison of the photocatalytic activity of stoichiometric BTO and commercial $TiO_2$ (Degussa P-25). Bandgap has been estimated using DRUV-vis and DFT studies.

| Catalyst | MO degradation (vis light λ ≥405 nm) | $H_2$ evolution (UV-vis light) | Bandgap $E_g$ (eV) |
|---|---|---|---|
| $TiO_2$ | <1% | 140 ml | 3.24 |
| BTO | 14% | 285 ml | 2.88 |

The photocatalytic ability of the BTO under visible light (λ≥405 nm) was also examined by monitoring the degradation of a textile dye, Methyl Orange. $TiO_2$ showed negligible photodegradation whereas BTO nanorods show 14% degradation during the same period (See Table 1). The photodegradation experiments were performed by coating the photocatalysts (BTO power or Degussa P 25 $TiO_2$) on an indium tin oxide (ITO) covered glass slide. Before coating, the ITO glass slides were washed thoroughly with DI water followed by ultrasonication in iso-propyl alcohol for 15 min. Conducting side of the cleaned ITO glass slides were coated with a solution prepared by mixing ethylene glycol (10 mL), ethanol (5 mL), polyvinylpyrrolidone (5 mg), and 10 mg of photocatalyst. The photocatalyst coated ITO glass slides were dried and annealing in oxygen for 3 h at 500° C. to remove any organic molecules. This makes a uniform film coating of the photocatalyst on ITO. A similar procedure was adopted to coat Degussa P-25. The photoactivity of the Degussa P-25 film was compared with the photo degradation activity of BTO films using 20 µM methyl orange in DI water as a test compound. The setup used for performing the photodegradation experiments is described in detail in Subramanian et al, Ind. Eng. Chem. Res., 2006, 45, 2187; Sohn et al., Appl. Catal B: Environ. 2008, 84, 372; and/or Kar et al., Environ. Sci. Technol. 2009, 43,32, which are expressly incorporated by reference herein in their entirety.

Figure 8:
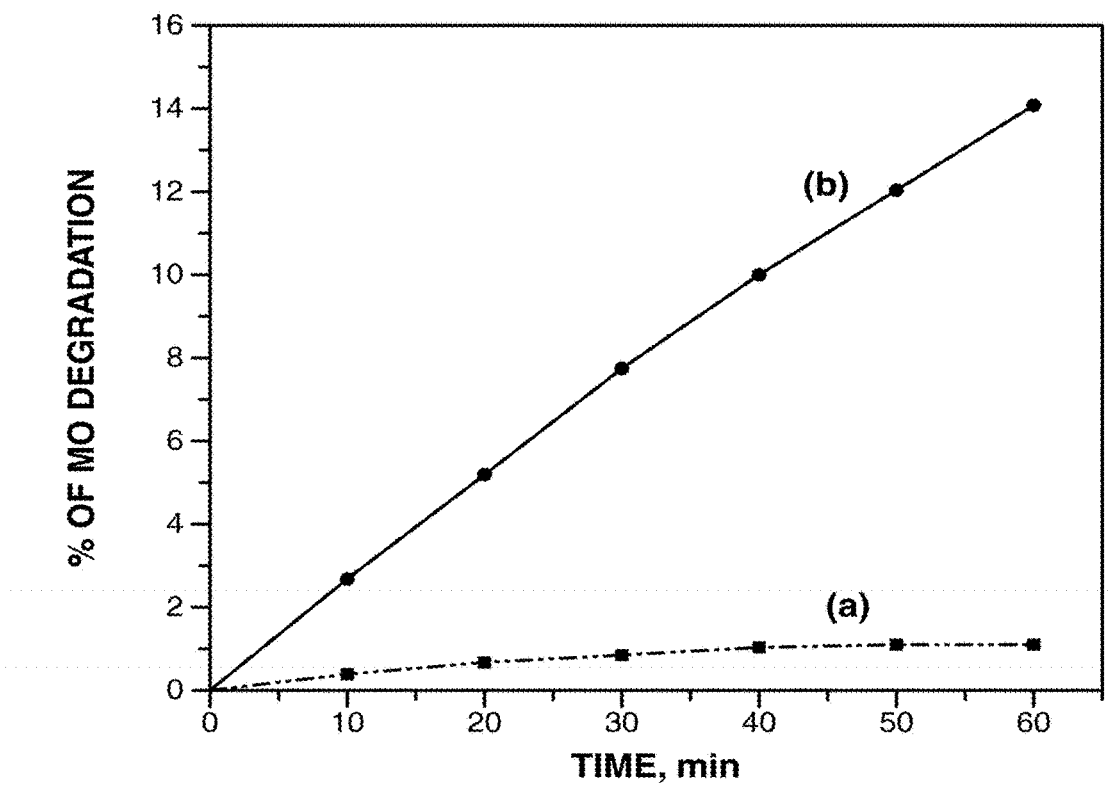
FIG. 8 is a graph of the photodegradation of methyl orange (MO) in the presence of visible light (λ≥405 nm) illumination and photocatalyst films prepared on indium tin oxide (ITO) covered glass slides using (a) Degussa P-25 $TiO_2$ and (b) BTO nanorods.

A 405 nm cutoff filter purchased from Newport Corporation was used to examine the effects of visible light illumination. Photocatalytic degradation of MO as a function of time is shown in FIG. 8. This confirms that the BTO nanorods demonstrate photoactivity in visible light.

A simple and robust template-free RM method to synthesize highly crystalline stoichiometric pyrochlore nanostructures, e.g., bismuth titanate nanorods, is disclosed herein.

The BTO nanorods demonstrate improved photocatalytic hydrogen generation as compared to, for example, commercial Degussa P-25. The BTO also shows visible light activity. The method may be used for preparing pyrochlores nanostructures for wide a range of applications including catalysis, electronics, and sensors.

While the present invention has been illustrated by a description of various embodiments and while these embodiments have been described in considerable detail, it is not the intention of the applicant to restrict or in any way limit the scope of the appended claims to such detail. The methods described herein present a new way to synthesize not just BTO but a family of compounds belonging to pyrochlores. For example, while discussion of the reverse micelle (RM) based template-free synthesis method has centered on synthesizing stoichiometric BTO pyrochlore nanorods, it should be understood that the bismuth and/or titanium may be replaced with other suitable materials, as desired. In other words, the A and/or B in $A_2B_2O_7$ can be something other than bismuth or titanium, as discussed herein. In addition, while BTO in stoichiometric pyrochlore ($Bi_2Ti_2O_7$) crystal structure shows promising photocatalytic activity, pyrochlores allow internal flexibility for different charge balanced combinations as well including, for example, $A_2^{3+}B_2^{4+}O_7$, $A_2^{2+}B_2^{5+}O_7$, and $A_2^{1+}B_2^{6+}O_7$. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A pyrochlore nanorod having the general formula $A_2B_2O_7$, wherein A is bismuth (Bi), calcium (Ca), strontium (Sr), yttrium (Y), barium (Ba), lanthanum (La), or combinations thereof; B is titanium (Ti), vanadium (V), chromium (Cr), manganese (Mn), iron (Fe), nickel (Ni), zirconium (Zr), hafnium (Hf), tantalum (Ta), tungsten (W), or combinations thereof; and O is oxygen.

2. The pyrochlore nanorod of claim 1, wherein the pyrochlore nanorod has an aspect ratio of about 1:10.

3. The pyrochlore nanorod of claim 1, wherein the pyrochlore nanorod has a diameter of about 40 nm to about 50 nm, and a length of about 400 nm to about 500 nm.

4. The pyrochlore nanorod of claim 1 having photocatalytic activity.

5. The pyrochlore nanorod of claim 1 wherein A is bismuth (Bi) and B is titanium (Ti).

6. The pyrochlore nanorod of claim 1, wherein B comprises a combination of two elements selected from titanium (Ti), vanadium (V), chromium (Cr), manganese (Mn), iron (Fe), nickel (Ni), zirconium (Zr), hafnium (Hf), tantalum (Ta), and tungsten (W).

7. A sphere-shaped pyrochlore nanostructure having the general formula $A_2B_2O_7$, wherein A is bismuth (Bi), calcium (Ca), strontium (Sr), yttrium (Y), barium (Ba), lanthanum (La), or combinations thereof; B is titanium (Ti), vanadium (V), chromium (Cr), manganese (Mn), iron (Fe), nickel (Ni), zirconium (Zr), hafnium (Hf), tantalum (Ta), tungsten (W), or combinations thereof; O is oxygen; and wherein the sphere-shaped pyrochlore nanostructure has a diameter of about 20 nm.

8. A sphere-shaped pyrochlore nanostructure having the general formula $A_2B_2O_7$, wherein A is bismuth (Bi), calcium (Ca), strontium (Sr), yttrium (Y), barium (Ba), lanthanum (La), or combinations thereof; B comprises a combination of two elements selected from titanium (Ti), vanadium (V), chromium (Cr), manganese (Mn), iron (Fe), nickel (Ni), zirconium (Zr), hafnium (Hf), tantalum (Ta), and tungsten (W); and O is oxygen.

9. A pyrochlore nanorod having the general formula $A_2B_2O_7$, wherein A is bismuth (Bi), calcium (Ca), strontium (Sr), yttrium (Y), barium (Ba), lanthanum (La), or combinations thereof; B is titanium (Ti), vanadium (V), chromium (Cr), manganese (Mn), iron (Fe), nickel (Ni), zirconium (Zr), tin (Sn), hafnium (Hf), tantalum (Ta), tungsten (W), or combinations thereof; O is oxygen; and wherein the pyrochlore nanorod has a diameter of about 40 nm to about 50 nm, and a length of about 400 nm to about 500 nm.

* * * * *

UNITED STATES PATENT AND TRADEMARK OFFICE
CERTIFICATE OF CORRECTION

PATENT NO. : 9,561,493 B2
APPLICATION NO. : 14/552230
DATED : February 7, 2017
INVENTOR(S) : Vaidyanathan Subramanian and Sankaran Murugesan Page 1 of 1

It is certified that error appears in the above-identified patent and that said Letters Patent is hereby corrected as shown below:

On the Title Page

Item (71), "Applicants: Vaidanathyan Subramanian, Sparks, NV (US); Sankaran Murugesan, Austin, TX (US)" should read -- Applicant: Board of Regents of the Nevada System of Higher Education on behalf of the University of Nevada, Reno, Reno, NV (US) --.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*